US012101598B2

(12) United States Patent
Voishvillo

(10) Patent No.: US 12,101,598 B2

(45) Date of Patent: Sep. 24, 2024

(54) COMPRESSION DRIVER WITH DOME DIAPHRAGM AND ANNULAR EXIT

(71) Applicant: HARMAN INTERNATIONAL INDUSTRIES, INCORPORATED, Stamford, CT (US)

(72) Inventor: Alexander Voishvillo, Simi Valley, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 17 days.

(21) Appl. No.: 17/777,510

(22) PCT Filed: Dec. 2, 2019

(86) PCT No.: PCT/US2019/063952

§ 371 (c)(1),
(2) Date: May 17, 2022

(87) PCT Pub. No.: WO2021/112814

PCT Pub. Date: Jun. 10, 2021

(65) Prior Publication Data

US 2023/0362535 A1 Nov. 9, 2023

(51) Int. Cl.
*H04R 1/34* (2006.01)
*H04R 1/28* (2006.01)

(52) U.S. Cl.
CPC ........... *H04R 1/345* (2013.01); *H04R 1/2865* (2013.01); *H04R 2201/34* (2013.01); *H04R 2400/13* (2013.01)

(58) Field of Classification Search
CPC .............. H04R 1/2865; H04R 2201/34; H04R 2400/13; H04R 1/345
See application file for complete search history.

(56) References Cited

U.S. PATENT DOCUMENTS

| | | | | |
|---|---|---|---|---|
| 5,163,167 | A | 11/1992 | Heil | |
| 7,039,211 | B2 * | 5/2006 | Werner | H04R 1/30 381/339 |
| 7,735,599 | B2 | 6/2010 | Kubota | |
| 10,038,954 | B2 | 7/2018 | Voishvillo | |

(Continued)

FOREIGN PATENT DOCUMENTS

| | | |
|---|---|---|
| GB | 2211377 A | 6/1989 |
| WO | 03084288 A1 | 10/2003 |

OTHER PUBLICATIONS

International Search Report and Written Opinion for Application No. PCT/US2019/063952, dated Jul. 29, 2020, 14 pages.

(Continued)

*Primary Examiner* — Sunita Joshi

(74) *Attorney, Agent, or Firm* — Brooks Kushman P.C.

(57) ABSTRACT

A compression driver includes a dome diaphragm having a convex surface and a concave surface and a phasing plug having a base portion with a first side and an opposed second side. The base portion first side is disposed adjacent the convex surface of the diaphragm and defines a compression chamber therebetween. The base portion includes a plurality of channels that extend therethrough from the first side to the second side for sound waves to travel through the base portion, the plurality of channels converging to form an annular exit of the compression driver.

20 Claims, 5 Drawing Sheets

(56) References Cited

U.S. PATENT DOCUMENTS

| | | | |
|---|---|---|---|
| 2008/0264717 | A1 | 10/2008 | Onishi |
| 2010/0329495 | A1 | 12/2010 | Wendell et al. |
| 2012/0027238 | A1 | 2/2012 | Voishvillo |
| 2016/0212523 | A1 | 7/2016 | Spillman et al. |
| 2018/0063636 | A1 | 3/2018 | Spillman et al. |

OTHER PUBLICATIONS

International Preliminary Report on Patentability for Application No. PCT/US2019/063952, dated Jun. 16, 2022, 8 pages.

* cited by examiner

COMPRESSION DRIVER WITH DOME DIAPHRAGM AND ANNULAR EXIT

CROSS-REFERENCE TO RELATED APPLICATION

This application is the U.S. national phase of PCT Application No. PCT/US2019/063952 filed on Dec. 2, 2019, the disclosure of which is incorporated in its entirety by reference herein.

TECHNICAL FIELD

Embodiments relate to a compression driver for a transducer having a dome diaphragm and an annular exit to the waveguide.

BACKGROUND

Compression drivers can be divided into two groups: drivers based on dome diaphragms and drivers based on annular flexural diaphragms. Both categories of drivers have their strengths and weaknesses. Dome diaphragm drivers typically have a larger diaphragm area and therefore provide higher sound pressure level (SPL) output. Dome diaphragm-based, large-format compression drivers (with a voice coil diameter of 2 inches and larger) typically have metallic domes formed out of titanium, aluminum, magnesium, or beryllium foil. Metallic diaphragms are heavier than their polymer counterparts and may have a lower resonance, providing more efficient reproduction of lower frequencies. However, they have a lower mass-controlled velocity at high frequency and therefore lower SPL output at high frequencies. This is often compensated for by the high frequency breakups of the diaphragm. The breakups increase overall output acceleration, and therefore the in-phase components of acceleration contribute to an increased high frequency SPL output. However, the breakups are accompanied by an increase in nonlinear distortion including subharmonics and irregularity of the frequency response at high frequencies.

The majority of modern annular diaphragms are made of polymer films. The advantage of annular diaphragms is the smaller radial dimensions of the moving part of the diaphragm compared to dome diaphragms having the same diameter of the moving voice coil. Annular diaphragm-based drivers have smaller radial compression chamber dimensions, which relates to higher radial resonance frequencies. With an increase in the voice coil diameter, the dome compression chamber has resonances that start at lower frequencies, and their number increases in the audio frequency range. In contrast, annular diaphragm compression drivers may have a larger voice coil without increasing the radial dimension, with the same number of resonances in the compression chamber. However, a disadvantage of annular flexural diaphragm assemblies is that their area is smaller compared to the area of an equivalent dome diaphragm assembly.

Both types of compression drivers typically have a circular exit. The diameter of the exit is related to cross-modes that are excited at the entrance of the corresponding horn or waveguide and to the directivity control at high frequencies. In a regular, constant-directivity waveguide, control of directivity is lost when the diameter of the driver's exit (equal to the diameter of the waveguide or horn entrance) is comparable to the wavelength of the radiated signal. The same effect is observed in waveguides used in line arrays, where larger exit diameters worsen the high-frequency directivity control.

In line arrays, the entrance of the waveguide is typically circular, whereas the exit of the waveguide is rectangular with its vertical dimension significantly larger than the horizontal one. As such, wide directivity is provided in the horizontal plane and narrow directivity is provided in the vertical plane. The goal of waveguides in line arrays is to transform the circular entrance to the rectangular exit and provide a "flat" wavefront in the vertical plane, creating a cylindrical wave instead of a spherical one when a number of line arrays is stacked vertically and a single or several waveguides form a very long vertically oriented radiator. This is accomplished via the progressive time delay of sound waves towards the middle of the vertically-oriented exit in such a way that the arrival time of sound waves is equal along the vertical profile of the waveguide. In all such drivers with a circular exit and corresponding circular entrance to the waveguide, the acoustical path must narrow to reach the exit of the driver, and then start widening again in the waveguide, creating unnecessary redundancy.

SUMMARY

In one or more embodiments, a compression driver includes a dome diaphragm having a convex surface and a concave surface and a phasing plug having a base portion with a first side and an opposed second side. The base portion first side is disposed adjacent the convex surface of the diaphragm and defines a compression chamber therebetween. The base portion includes a plurality of channels that extend therethrough from the first side to the second side for sound waves to travel through the base portion, the plurality of channels converging to form an annular exit of the compression driver.

In one or more embodiments, a transducer includes a compression driver including a dome diaphragm having a convex surface and a concave surface, and a phasing plug having a base portion with a first side and an opposed second side. The base portion first side is disposed adjacent the convex surface of the diaphragm and defines a compression chamber therebetween. The phasing plug has a hub portion extending outwardly from the base portion second side along a central axis, the hub portion having a first end and a second end and an outer surface. The base portion includes a plurality of channels that extend therethrough from the first side to the second side, the plurality of channels converging to form an annular exit of the compression driver. A housing is disposed on the base portion and has a first end and a second end and an inner surface, the hub portion and the housing together forming a waveguide having an inlet adjacent the compression driver and an outlet to the ambient environment.

In one or more embodiments a transducer includes a compression driver including a dome diaphragm having a convex surface and a concave surface and a magnet assembly disposed adjacent the concave surface of the diaphragm. The compression driver further includes a phasing plug having a base portion with a first side and an opposed second side, the base portion first side disposed adjacent the convex surface of the diaphragm and defining a compression chamber therebetween. The phasing plug has a hub portion extending outwardly from the base portion second side along a central axis. The base portion includes a plurality of channels that extend therethrough from the first side to the second side, the plurality of channels including concentric annular passages converging to form an annular exit of the compression driver. A housing is disposed on the base portion, the hub portion and the housing together forming a waveguide, where the waveguide has an annular inlet adjacent the compression driver and a rectangular outlet to the ambient environment.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
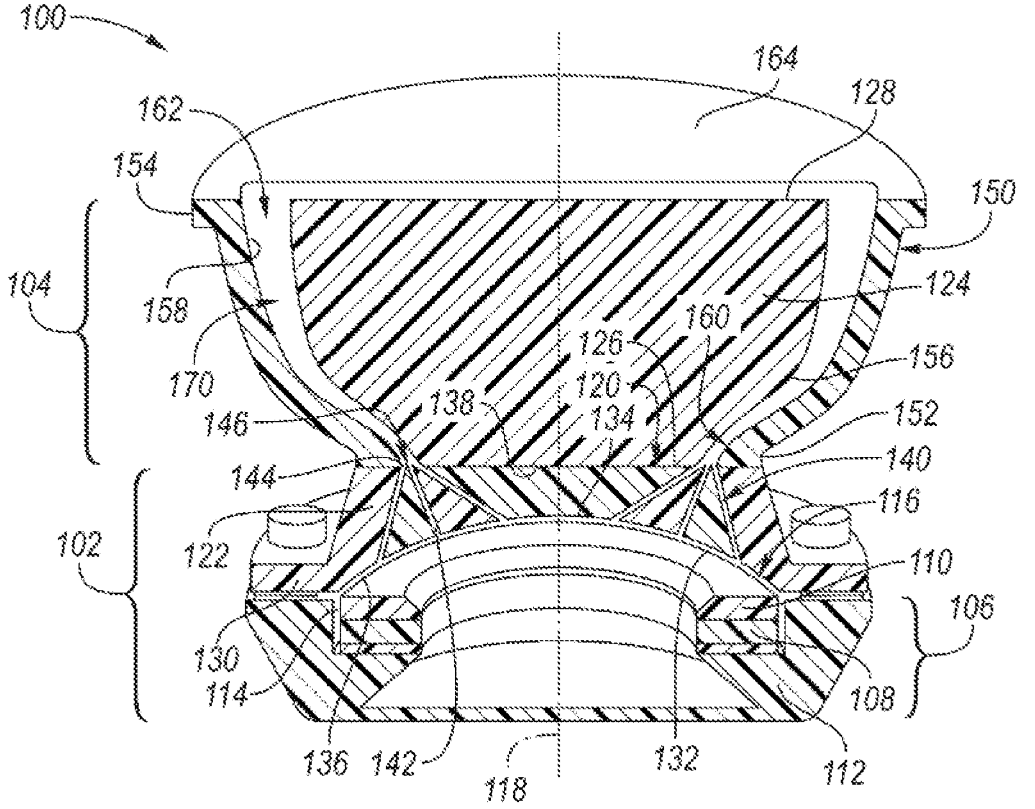
FIG. 1 is a cross-sectional view taken along a vertical plane illustrating a transducer according to one or more embodiments.
Figure 2:
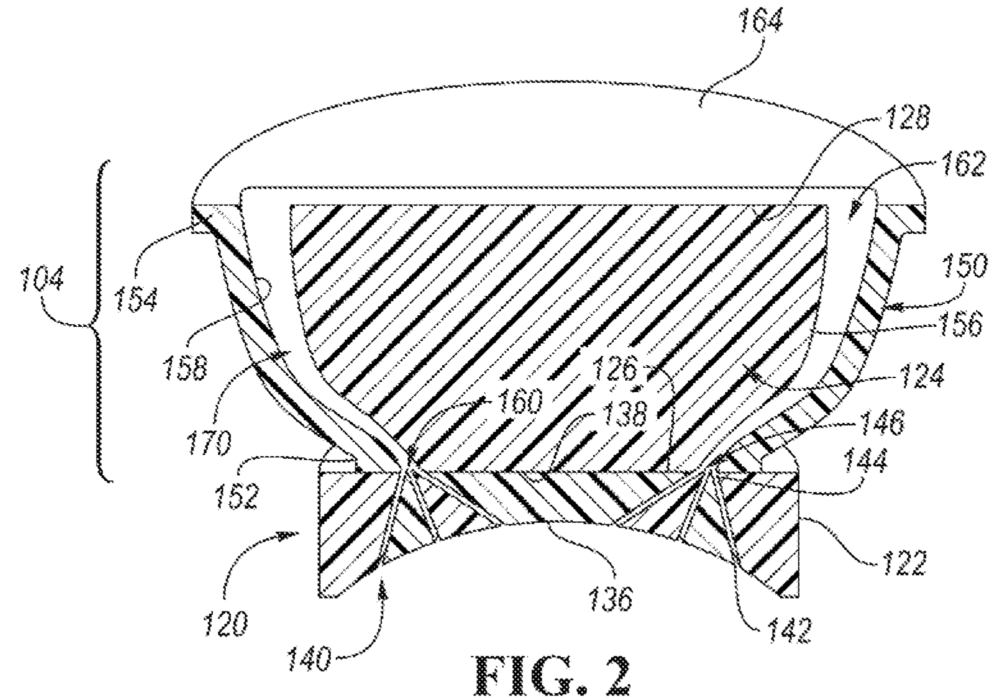
FIG. 2 is a cross-sectional view taken along a vertical plane illustrating the phasing plug and waveguide of the transducer.
Figure 3:
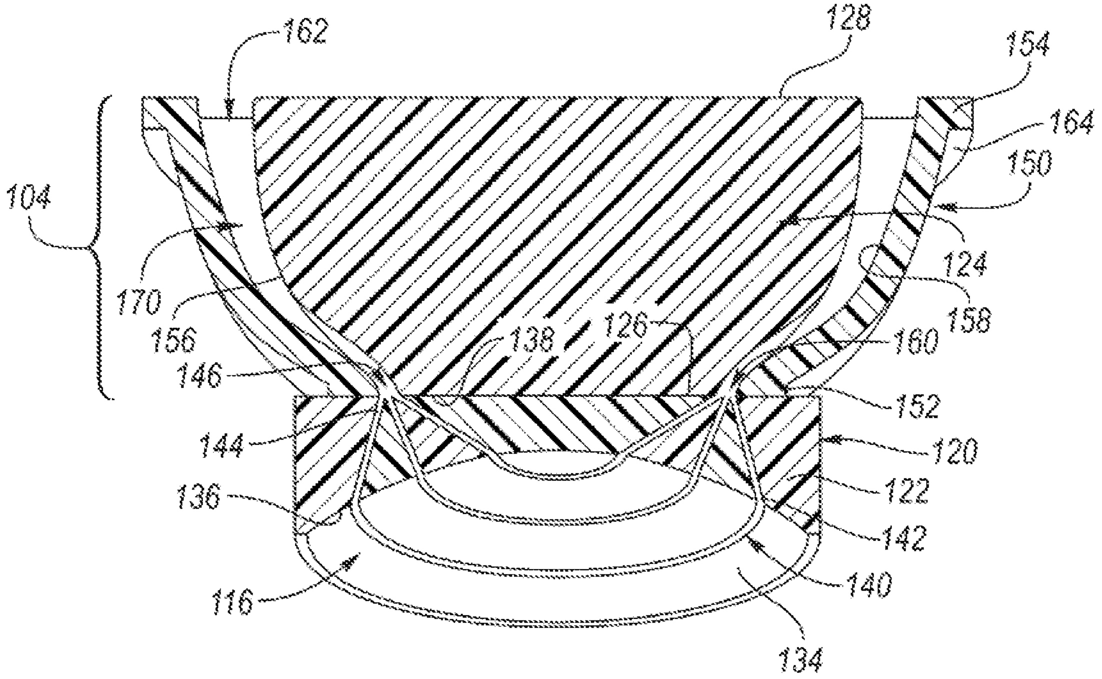
FIG. 3 is a partial perspective view along a vertical plane illustrating the phasing plug and dome diaphragm.
Figure 4:
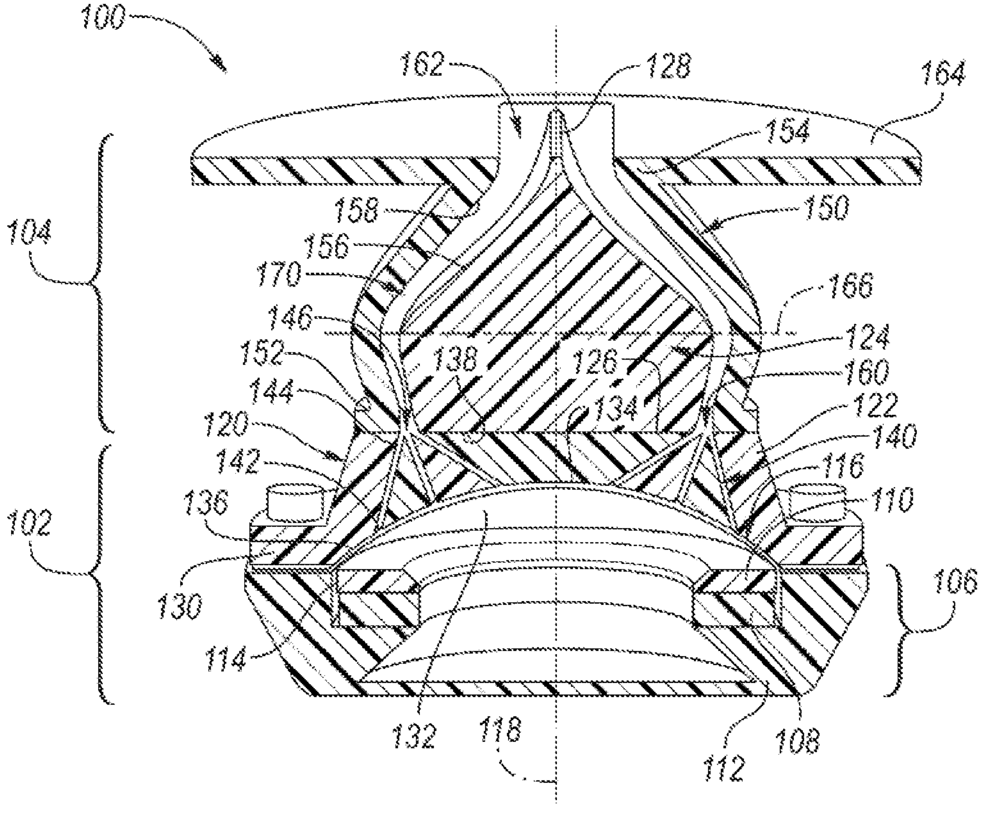
FIG. 4 is a cross-sectional view taken along a horizontal plane illustrating the transducer according to one or more embodiments.
Figure 5:
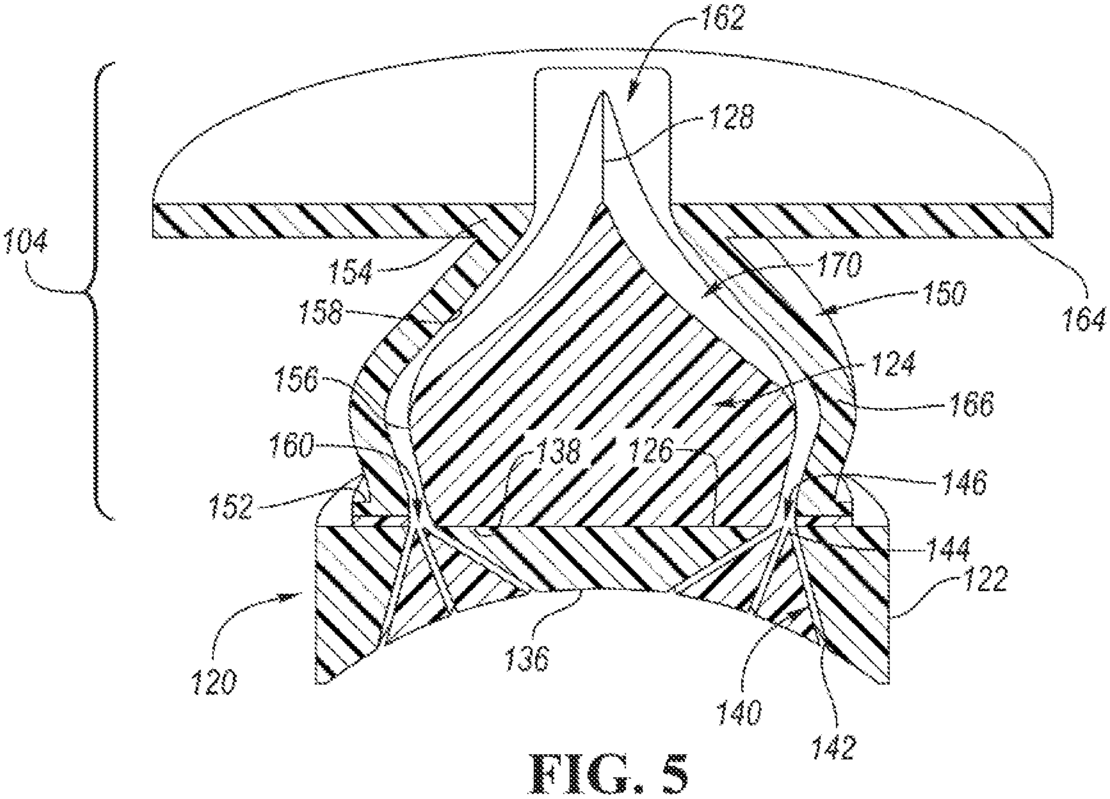
FIG. 5 is a cross-sectional view taken along a horizontal plane illustrating the phasing plug and waveguide of the transducer.
Figure 6:
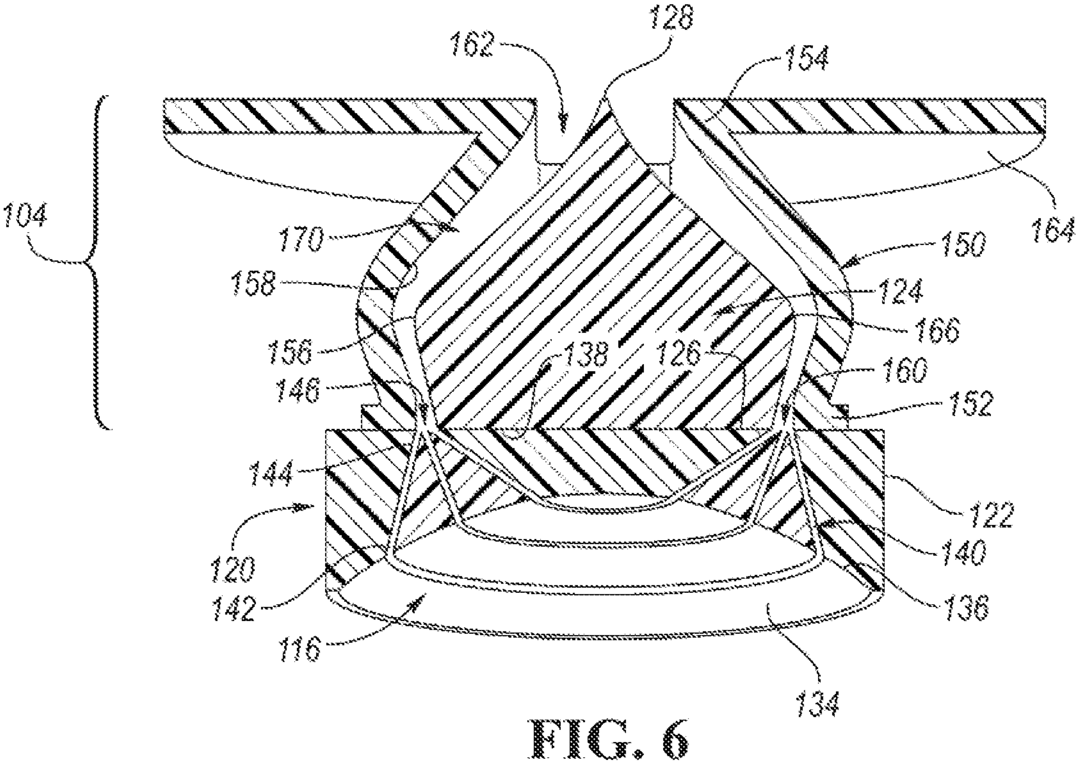
FIG. 6 is a partial perspective view along a horizontal plane illustrating the phasing plug and dome diaphragm.
Figure 7:
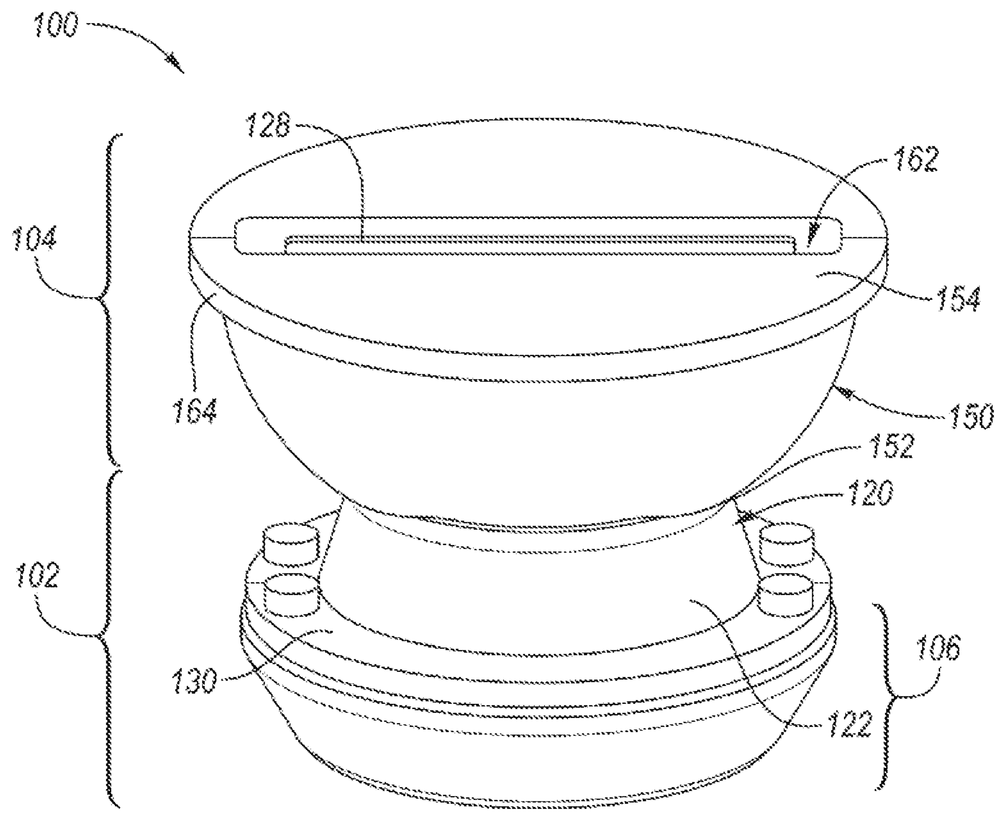
FIG. 7 is a perspective view of the transducer with the waveguide oriented along a vertical plane.
Figure 8:
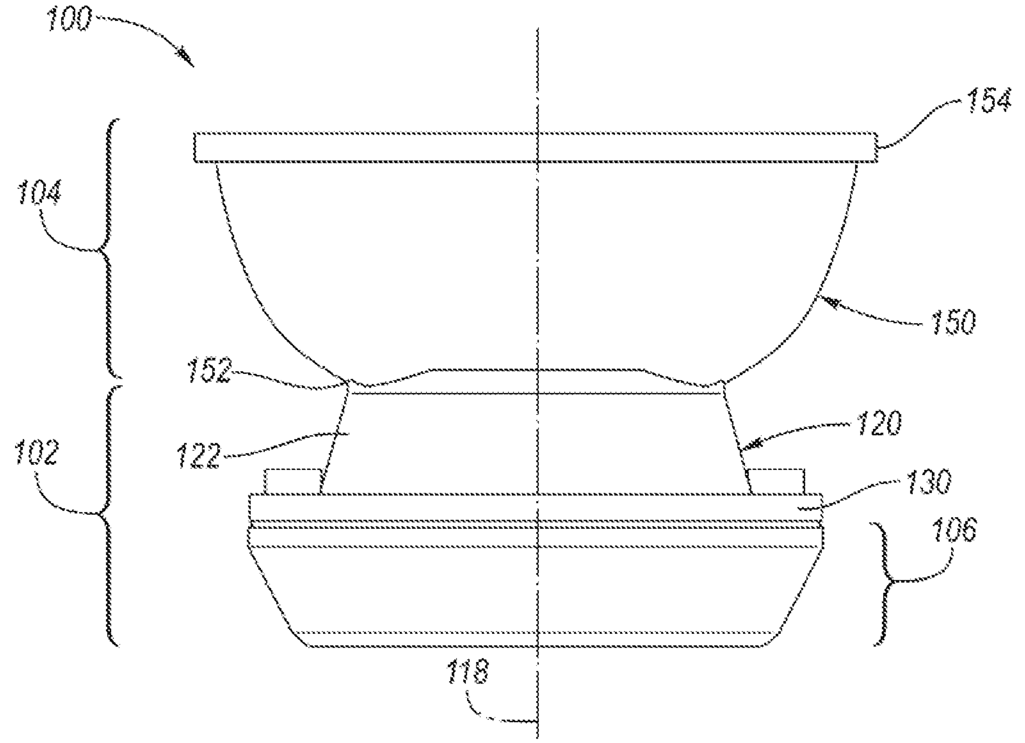
FIG. 8 is a side view of the transducer of FIG. 7.
Figure 9:
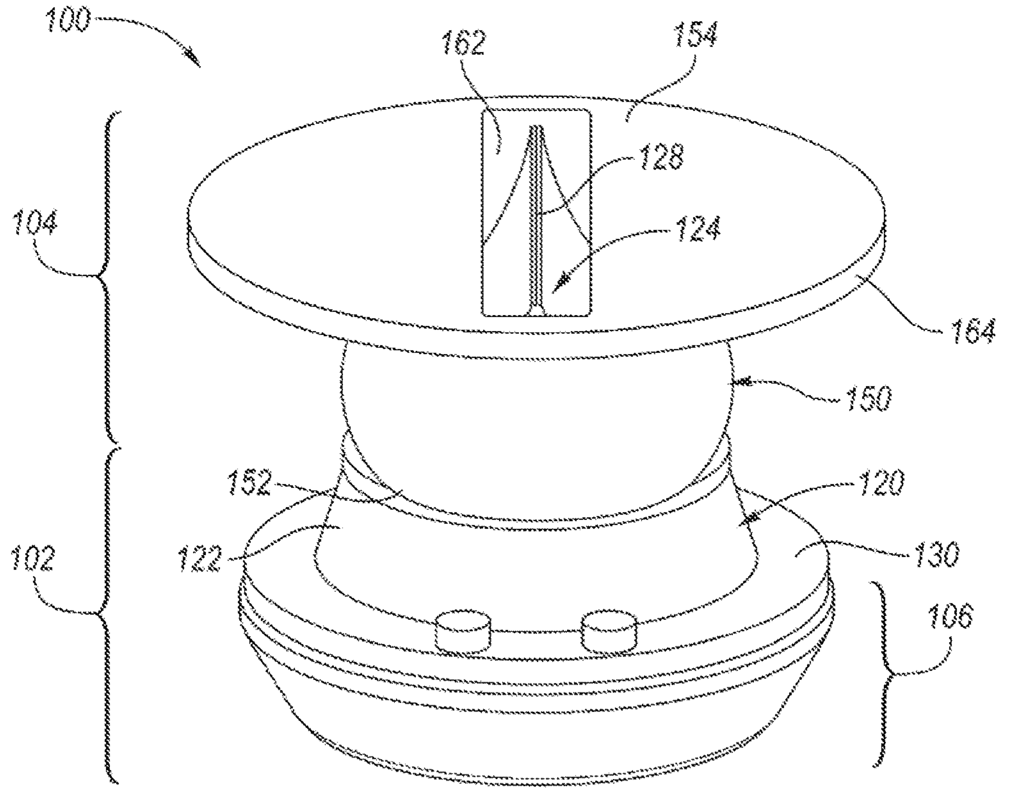
FIG. 9 is a perspective view of the transducer with the waveguide oriented along a horizontal plane.
Figure 10:
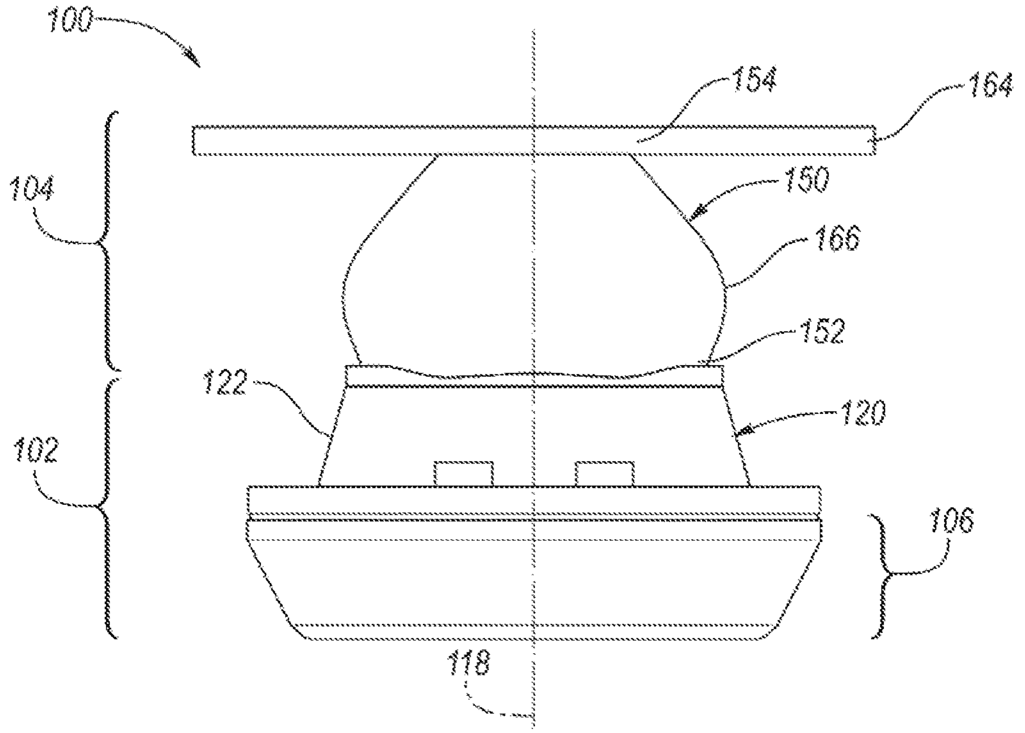
FIG. 10 is a side view of the transducer of FIG. 9.

Embodiments of a transducer disclosed herein include a dome diaphragm-based compression driver with an annular driver exit and a waveguide with a corresponding annular inlet. With reference first to FIGS. 1 and 4, cross-sectional views of a transducer 100 are shown which includes a compression driver 102 and a waveguide 104. In one or more embodiments, the compression driver 102 includes a magnet assembly 106 which may comprise an annular permanent magnet 108 disposed between an annular top plate 110 and a back plate 112. The magnet assembly 106 provides a permanent magnetic field for electrodynamic coupling with a voice coil 114. The voice coil 114 is mechanically coupled to a diaphragm 116 and produces movement thereof to convert received electrical signals into sound waves which are propagated from the compression driver 102 toward the waveguide 104. In one or more embodiments, the diaphragm 116 has a dome configuration and is disposed coaxially with a central axis 118 above the magnet assembly 106.

As shown in FIGS. 1-6, the compression driver 102 further includes a phasing plug 120 having a base portion 122 and a hub portion 124 extending outwardly or upwardly from the base portion 122, both of which are coaxially disposed about the central axis 118. The hub portion 124 has a first end 126 disposed proximate to the base portion 122 and a second end 128 disposed at a distance from the base portion 122. The hub portion 124 may be integrally formed with the base portion 122 or may be attached to the base portion 122 by any suitable means. As an alternative to the solid hub portion 124 depicted herein, an interior of the hub portion 124 could alternatively be hollowed out to decrease weight and/or cost. The base portion 122 of the phasing plug 120 may be generally circular or may have any other suitable geometry. The phasing plug 120 may include a circumferential flange 130 for coupling or mounting (e.g., via bolts as shown in FIGS. 1, 4, and 7-10) the phasing plug 120 to the back plate 112 of the magnet assembly 106.

With reference to FIGS. 1, 3-4 and 6, the dome diaphragm 116 has a lower, concave surface 132 and an upper, convex surface 134. Contrary to typical compression drivers with dome diaphragms where the acoustic signal is directed by the phasing plug adjacent the concave surface of the dome, in one or more embodiments disclosed herein the acoustic signal may enter the phasing plug 120 from the convex surface 134 of the dome diaphragm 116. The base portion 122 of the phasing plug 120 includes a first side 136 facing the convex surface 134 of the diaphragm 116 and an opposing second side 138 facing the waveguide 104. The first side 136 may be generally concave, complementary to the convex surface 134 of the diaphragm 116, whereas the second side 138 may be generally planar. It is understood that any directional terms as used herein are merely to indicate the relative placement of various components of the transducer 100, and are not intended to be limiting.

As shown in FIGS. 1-6, the base portion 122 of the phasing plug 120 further includes at least one channel 140 that extends as a passage through the base portion 122 from the first side 136 to the second side 138 through which sound waves created by the diaphragm 116 may travel. A compression chamber is defined in a space between the convex surface 134 of the diaphragm 116 and the first side 136 of the phasing plug base portion 122. In practice, the height of the compression chamber may be quite small (e.g., approximately 0.5 mm or less) such that the volume of the compression chamber is also small. The actuation of the diaphragm 116 generates high sound pressure acoustical signals within the compression chamber, and the signals travel as sound waves through the base portion 122 of the phasing plug 120 via the channels 140. In a non-limiting embodiment, sound-absorbing material may be disposed under the concave surface 132 of the diaphragm 116 to mitigate any air resonances in this cavity.

As depicted herein, a plurality of channels 140 may be provided as annular passages arranged circumferentially about the central axis 118, forming concentric circles adjacent the convex surface 134 of the diaphragm 116. The channels 140 may be positioned at concentric radii in order to provide blocking of radial acoustical modes excited in the compression chamber. The channels 140 serve to carry sound waves from all areas of the convex surface 134 of the diaphragm 116 through the phasing plug 120 and into the waveguide 104. The channels 140 each have a first end 142 adjacent the convex surface 134 of the diaphragm 116 and in communication with the compression chamber, and a second end 144 at the second side 138 of the base portion 122. The channels 140 may each have substantially similar lengths from their first ends 142 to their second ends 144, where the second ends 144 of the channels 140 all converge to form an annular exit 146 to the compression driver 102, such that each pulse of sound reaches the waveguide 104 as one coherent wavefront.

As illustrated in FIGS. 1-10, the hub portion 124 is disposed within a housing 150 having a first end 152 disposed on or attached to the phasing plug 120 (e.g., at the second side 138 of the base portion 122), and a second end 154 disposed at a distance from the base portion 122. The hub portion 124 and the housing 150 together form the waveguide 104. More particularly, an outer surface 156 of the hub portion 124 and an inner surface 158 of the housing 150 may cooperatively define the waveguide 104 and provide a path for the propagation of sound waves from an inlet 160 of the waveguide 104 to an outlet or exit aperture 162 of the waveguide 104. In the assembled waveguide 104, the exit aperture 162 may be generally aligned with the hub portion 124. The waveguide 104 may function to control directivity of sound waves (i.e., coverage of sound pressure over a particular listening area) that propagate out of the transducer 100 into the ambient environment and to increase reproduced SPL over a certain frequency range. The housing 150 may include a generally planar flange 164 surrounding the outlet 162, which may be generally circular as depicted herein, which can be used to couple the transducer 100 to a transducer housing or other component of a loudspeaker system.

The waveguide inlet 160 may be a continuous, annular ring formed by the outer surface 156 of the hub portion 124 at its first end 126 and the inner surface 158 of the housing 150 at its first end 152. The waveguide outlet 162 may be embodied as a rectangular exit aperture provided at the second end 154 of the housing 150, with a smaller dimension in a horizontal plane and a larger dimension in a vertical plane. This configuration provides wide directivity response (wider dispersion) in the horizontal plane and narrower dispersion in the vertical plane, which typically satisfies requirements for the directivity of horn drivers in practical applications. The requirement for narrow directivity in the vertical plane is especially important in line array applications where the overall array includes numerous separate systems which form a vertical wavefront close to that of a cylindrical sound wave to avoid undesirable dispersion of sound energy in the vertical plane and increase coverage distance.

The contour of the outer surface 156 of the hub portion 124 and the inner surface 158 of the housing 150 may "shape" and improve the wavefront, making it flatter at the exit of the transducer 100 (exit aperture 162). The shape of the hub portion 124 has different profiles in the vertical and horizontal planes that may provide time alignment and, correspondingly, a flat wavefront in the vertical plane at the exit aperture 162. In modern waveguides that are typically used in line arrays, the vertical directivity is controlled by the phase and time relationships of the acoustical signals radiated at different vertical points within the waveguide 104. The typical goal is equal time arrival and in-phase radiation across the vertical dimension of the rectangular exit aperture 162 that provides a "flat" wavefront in the vertical plane.

As illustrated in FIGS. 1-6, the shape of the inner surface 158 of the housing 150 and the outer surface 156 of the hub portion 124 are continuous, smooth, undulating surfaces that provide an uninterrupted pathway from the waveguide inlet 160 to the waveguide outlet 162. The transformation of the air path from the annular exit 146 of the compression driver 102 and the corresponding annular waveguide inlet 160 to the rectangular exit aperture 162 may be provided by a customized shape of the hub portion 124 that starts with a generally circular cross-section at the first end 126 and then transitions into a blade-like shape at the second end 128. The waveguide 104 is symmetric with respect to both a vertical plane (FIGS. 1-3 and 7-8) and a horizontal plane (FIGS. 4-6 and 9-10).

Regions of the hub portion 124 below a transition point 166 along the vertical dimension of the waveguide 104 may follow one curvature and regions of the hub portion 124 above the transition point 166 may follow another curvature. As such, the hub portion outer surface 156 and the housing inner surface 158 may protrude outward farther from the central axis 118 adjacent the transition point 166 compared with below or above the transition point 166, wherein the transition point 166 can have any suitable location between the waveguide inlet 160 and the waveguide outlet 162. For example, with reference to FIGS. 4-6 which depicts cross-sectional views along a horizontal plane, the outer surface 156 of the hub portion 124 may be substantially linear from the waveguide inlet 160 to the transition point 166. The outer surface 156 may then curve inward until terminating in the blade-like shape at the hub portion second end 128. The inner surface 158 of the housing 150 may curve slightly outward from the waveguide inlet 160 to the transition point 166, then may curve slightly inward until reaching the waveguide outlet 162. The inward curvature of the inner surface 158 is less than the inward curvature of the outer surface 156, thereby increasing the cross-section or width of the annular waveguide pathway 170.

Accordingly, the waveguide 104 provides an annular pathway 170 for sound waves to travel from the annular waveguide inlet 160 to the rectangular exit aperture 162. The internal cross-sectional area or width of the annular pathway 170 generally increases from the inlet 160 to the outlet 162 of the waveguide 104. The waveguide 104 controls the propagation of sound waves by providing substantially equal sound path lengths from the exit 146 of the compression driver 102, providing a controlled cross-sectional area expansion rate from the inlet 160 to the outlet 162 of the waveguide 104.

In the embodiments disclosed herein, using a dome diaphragm provides an effective area greater than that of an annular diaphragm, increasing the maximum SPL output of the compression driver. In addition, the dome diaphragm has a comparatively low resonance frequency, and the combination of these properties makes the transducer well suited for two-way line arrays. Still further, the smaller cross-sectional dimensions of the acoustical paths, compared to a driver with a circular exit, improves directivity control at high frequencies. Lastly, the annular interface of the compression driver and the waveguide has a significant advantage of a much shorter driver-waveguide assembly. In a driver with a circular exit, the acoustical path narrows to reach the exit, and then starts widening again in the waveguide. However, in the transducer disclosed herein, the acoustical path widens gradually from the phasing plug through the waveguide, thereby omitting the redundant stage of "narrowing-widening" is omitted and allowing the assembly to be much shorter.

While exemplary embodiments arc described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A compression driver, comprising:

a dome diaphragm having a convex surface and a concave surface; and a phasing plug having a base portion with a first side and an opposed second side, the base portion first side disposed adjacent the convex surface of the diaphragm and defining a compression chamber therebetween, the base portion including a plurality of channels that extend therethrough from the first side to the second side for sound waves to travel through the base portion, the plurality of channels converging to form an annular exit of the compression driver.

2. The compression driver of claim 1, wherein the plurality of channels include concentric annular passages.

3. The compression driver of claim 1, wherein the plurality of channels each have substantially similar lengths from a first end to a second end thereof.

4. The compression driver of claim 1, wherein the first side of the base portion is generally concave and the second side of the base portion is generally planar.

5. The compression driver of claim 1, further comprising a magnet assembly disposed adjacent the concave side of the diaphragm.

6. The compression driver of claim 1, wherein the phasing plug has a hub portion extending outwardly from the base portion second side along a central axis.

7. The compression driver of claim 6, wherein the hub portion has a generally cylindrical cross-section at a first end proximate the base portion and transitions into a blade shape at a second end disposed at a distance from the base portion.

8. A transducer, comprising:

a compression driver including a dome diaphragm having a convex surface and a concave surface; and a phasing plug having a base portion with a first side and an opposed second side, the base portion first side disposed adjacent the convex surface of the diaphragm and defining a compression chamber therebetween, the phasing plug having a hub portion extending outwardly from the base portion second side along a central axis, the hub portion having a first end and a second end and an outer surface, the base portion including a plurality of channels that extend therethrough from the first side to the second side, the plurality of channels converging to form an annular exit of the compression driver; and a housing disposed on the base portion and having a first end and a second end and an inner surface, the hub portion and the housing together forming a waveguide having an inlet adjacent the compression driver and an outlet to the ambient environment.

9. The transducer of claim 8, wherein the outer surface of the hub portion and the inner surface of the housing together define an annular pathway for sound waves to travel through the waveguide.

10. The transducer of claim 9, wherein a cross-sectional area of the annular pathway increases from the inlet to the outlet of the waveguide.

11. The transducer of claim 8, wherein the waveguide inlet is an annular ring formed by the outer surface of the hub portion at the hub portion first end and the inner surface of the housing at the housing first end.

12. The transducer of claim 8, wherein the waveguide outlet includes a rectangular exit aperture at the second end of the housing.

13. The transducer of claim 8, wherein the waveguide outlet is generally aligned with the second end of the hub portion.

14. The transducer of claim 8, wherein the hub portion has a generally cylindrical cross-section at the first end and transitions into a blade shape at the second end.

15. The transducer of claim 8, wherein the plurality of channels include concentric annular passages.

16. The transducer of claim 8, wherein the plurality of channels each have substantially similar lengths from a first end to a second end thereof.

17. The transducer of claim 8, wherein the first side of the base portion is generally concave and the second side of the base portion is generally planar.

18. The transducer of claim 8, further comprising a magnet assembly disposed adjacent the concave side of the diaphragm.

19. The transducer of claim 8, wherein the housing includes a generally planar flange surrounding the waveguide outlet for coupling the transducer to a component of a loudspeaker system.

20. A transducer, comprising:

a compression driver including a dome diaphragm having a convex surface and a concave surface;

a magnet assembly disposed adjacent the concave surface of the diaphragm; and a phasing plug having a base portion with a first side and an opposed second side, the base portion first side disposed adjacent the convex surface of the diaphragm and defining a compression chamber therebetween, the phasing plug having a hub portion extending outwardly from the base portion second side along a central axis, the base portion including a plurality of channels that extend therethrough from the first side to the second side, the plurality of channels including concentric annular passages converging to form an annular exit of the compression driver; and a housing disposed on the base portion, the hub portion and the housing together forming a waveguide, the waveguide having an annular inlet adjacent the compression driver and a rectangular outlet to the ambient environment.

* * * * *